United States Patent [19]

Welbon

[11] 4,414,021
[45] Nov. 8, 1983

[54] PROCESS FOR THE SYNTHESIS OF IRON POWDER

[76] Inventor: William W. Welbon, Belleair, Fla.

[73] Assignee: The United States of America as represented by the U.S. Department of Energy, Washington, D.C.

[21] Appl. No.: 375,519

[22] Filed: May 6, 1982

[51] Int. Cl.$^3$ .............................................. C21B 15/00
[52] U.S. Cl. .................................. 75/0.5 AA; 75/108
[58] Field of Search ............. 75/0.5 AA, 0.5 BA, 108, 75/119

[56] References Cited

U.S. PATENT DOCUMENTS

| 2,730,441 | 1/1956 | Crowley | 75/0.5 AA |
| 2,827,473 | 3/1958 | Franklin et al. | 75/0.5 AA |
| 2,867,524 | 1/1959 | Chang | 75/0.5 AA |
| 4,388,116 | 6/1983 | Carrillo-Cantu | 75/256 |

Primary Examiner—W. Stallard
Attorney, Agent, or Firm—Armand McMillan; Albert Sopp; Richard G. Besha

[57] ABSTRACT

A process for preparing iron powder suitable for use in preparing the iron-potassium perchlorate heat-powder fuel mixture used in thermal batteries, comprises preparing a homogeneous, dense iron oxide hydroxide precipitate by homogeneous precipitation from an aqueous mixture of a ferric salt, formic or sulfuric acid, ammonium hydroxide and urea as precipitating agent; and then reducing the dense iron oxide hydroxide by treatment with hydrogen to prepare the iron powder.

7 Claims, 2 Drawing Figures

PROCESS FOR THE SYNTHESIS OF IRON POWDER

The U.S. Government has rights in this invention pursuant to Contract No. DE-AC04-76DP00656 between the U.S. Department of Energy and General Electric Company.

BACKGROUND OF THE INVENTION

This invention relates to a process for preparing iron powder which, e.g., can be used as the iron component in the iron-potassium perchlorate heat-powder mixture used as fuel in conventional thermal batteries. See, e.g., Jennings, "Thermal Batteries" The Primary Battery Vol. 2, John Wiley and Sons, 1976, Chapter 6; Quinn et al, "Performance Data for a Lithium-Silicon/Iron Disulfide, Long Life, Primary Thermal Battery" in Proceedings of The 29th Power Sources Conference Electrochemical Society, June 1980; Bush, "Advancements in Pellet-Type Thermal Battery Technology" Sandia Laboratories, Albuquerque, New Mexico Report SC-RR-497A, October 1972; and Quinn et al, "Development of Lithium Alloy/Iron Disulfide 60-Minute Primary Thermal Battery", Sandia Laboratories Report 79-0814, April 1979.

Heretofore, the only iron powder available for use in preparing iron-potassium perchlorate heat-powder used as fuel in thermal batteries was the product identified as NX-1000 of Pfizer Metal and Composite Products, Pfizer, Inc., Wallingford, Connecticut. Iron which is suitable for these purposes must satisfy specification SS 344796-200 Issue B of Sandia Laboratories, which specification drawing is incorporated by reference herein as is its predecessor SS 265866-003.

Briefly, such iron powder is particularly characterized by a sponge-like physical configuration (See FIG. 1), a total iron content (as Fe) of 97% minimum, a metallic iron content of 89% minimum, an oxygen content (associated with iron) of 2.3% maximum, a Green strength (ASTM B312-56T) of 3,000–6,000 psi, preferably 4,000–6,000 psi, a Fisher subsive size of 1.5–3.5, a minimum of 70% passing through a −325 mesh and a maximum of 1.0% passing through a +100 mesh.

Of course, many processes are known for preparing iron powders. Exemplary references include British Pat. Nos. 1,286,257 and 1,288,252, Japanese Patent 72-02,020 and U.S. Pat. Nos. 3,827,879, 3,684,486 727,117, 727,118, 1,275,232, 2,217,569, 2,334,434, 2,441,770, 2,665,981, 2,699,387, 2,762,700, 2,818,328 2,927,016, 3,186,829, 3,494,761, and 4,046,557. However, none of these produces an iron powder which is suitable for the above-described use.

As can be seen, there has been a long lasting need for alternative sources of iron powder useful as the iron component in the pyrotechnic fuel used in thermal batteries.

SUMMARY OF THE INVENTION

Accordingly, it is an object of this invention to provide a process for preparing such iron powder.

It is another object of this invention to provide such a process which produces such iron powder in very high yield and very high purity.

Upon further study of the specification and appended claims, further objects and advantages of this invention will become apparent to those skilled in the art.

These objects have been obtained by providing a process for preparing iron powder suitable for use in preparing the iron-potassium perchlorate heat-powder fuel mixture used in thermal batteries, comprising preparing a homogeneous, dense iron oxide hydroxide precipitate by homogeneous precipitation from an aqueous mixture of a ferric salt, formic or sulfuric acid, ammonium hydroxide and urea as precipitating agent; and then reducing the dense iron oxide hydroxide by treatment with hydrogen to prepare the iron powder. The process involves the decomposition of urea to produce ammonium hydroxide in solution and the subsequent precipitation of the iron hydroxide from a sulfuric or formic acid solution.

More particularly, these objects have been obtained by providing a process for preparing metallic iron powder having a spongelike structure, a total iron content of 97% minimum, a metallic iron ($Fe°$) content of 89% minimum, an oxygen content of 2.3% maximum, a Green strength of 4000–6000 psi, and a Fisher subsive size of 1.5–3.5, with a minimum of 70% of a size of −−325 mesh and a maximum of 1.0% of a size of +100 mesh, comprising, heating to boiling for 1–3 hours, an aqueous solution comprising 0.4–2 M of a solubilized ferric salt, 10–40 g/l of formic acid or sulfuric acid and 60–120 g/l of urea, thereby containing a precipitate, separating the precipitate, drying it, and reducing the dried precipitate by treating it with hydrogen gas at 650°–900° C. for ½–2 hours, thereby producing iron ($Fe°$) powder having a total iron content of 97% minimum, a metallic iron ($Fe°$) content of 89% minimum, an oxygen content of 2.3% maximum, a Green strength of 4000–6000 psi, and a Fisher subsive size of 1.5–3.5, with a minimum of 70% of a size of −325 mesh and a maximum of 1.0% of a size of +100 mesh.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
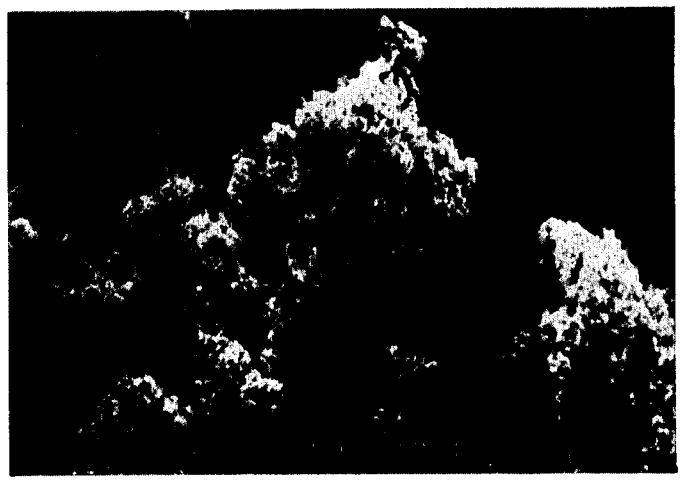
FIG. 1 depicts a scanning electron micrograph of NX-1000 (Pfizer) iron powder; 1000×.

The preparation of the dense FeO(OH) is accomplished by a precipitation method which is conventional per se. See, for example, Willard et al, Ind. & Eng. Chem., An. Ed., Vol. 9, 357 (1937); J.Am.Chem.Soc. 59, 1190 (1937); all of whose disclosures are incorporated by reference herein. Prior to the Willard et al method, the precipitation of iron hydroxides by the addition of ammonium hydroxide to an iron containing solution was well known but produced a gelatinous precipitate of ill defined structure. The Willard et al method of controlled precipitation produces a dense precipitate. It involves the homogeneous release of the precipitating agent in solution to produce a dense precipitate. However, this prior art technique has only been employed for purposes such as analysis of aluminum and studies of the chemical systems themselves and has never been employed to prepare an iron-containing product which can be the source for preparing an iron powder, e.g., by reduction.

In addition, the concept of reducing an iron salt by hydrogen to produce iron powder is, of course, also per se conventional. However, many of the details of the process of this invention as described herein are not conventional and form particularly important features of this invention.

Most importantly, it has heretofore never been suggested that these two steps could be combined in the manner of this invention to prepare an iron powder having the specific requirements necessary for use as the source of iron in the fuel mixture of thermal batteries. This is one of the primary aspects of the inventive nature of the process described herein.

The process of this invention can be carried out in accordance with the following procedures.

Firstly, an aqueous solution is prepared from which the dense iron-containing solid is to be precipitated.

The iron salt is typically contained therein in a concentration of 0.4-2.0 M, preferably 0.4-0.9 M. Generally, this corresponds to a concentration of about 205 g/l, e.g., for $FeCl_3.6H_2O$. Ferric salts are preferred. It is also possible to use ferrous salts but these must be accompanied by an oxidizing agent which oxidizes the ferrous ions to ferric ions since it is the latter which are required in the process. In addition, where there is a tendency for the ferric salt to be reduced to the corresponding ferrous salt under the conditions employed in the aqueous solution, it is advisable to also incorporate an oxidizing agent to maintain the iron in its ferric state. The need for the oxidizing agent can be determined by routine preliminary experiments. The preferred oxidizing agent is nitric acid, e.g., at the outset of a concentration of about 5-15 g/l; e.g., usually about 0.15 M.

Suitable iron salts include ferric chloride (e.g., hexahydrate), ferric sulfate, ferric formate, and ferric nitrate, etc. In the latter case, there would be a tendency for the formation of explosive mixtures. Ferric chloride is preferred.

If there is any difficulty in fully solubilizing the ferric salt, the aqueous solution can be heated, e.g., to 40°-60° C. Thereafter, it will be cooled to room temperature.

After the iron salt is fully solubilized, formic acid or sulfuric acid (e.g., when a sulfate salt is used) is added, preferably formic acid. This acid in combination with the subsequently added urea forms the requisite precipitating agent, ammonium hydroxide. The original concentration of the added acid in the aqueous solution is usually 10-40 g/l, e.g., usually about 0.45 M.

Thereafter, the urea is added, generally to a concentration of 60-120 g/l, e.g., usually at a concentration of about 1.3 M. Addition of the urea is followed by heating of the aqueous solution to boiling, i.e., under reflux conditions, for 1-3 hours typically.

The urea addition preferably is preceded by an addition of ammonium hydroxide to effect a concentration of ammonium formate (which is formed upon addition of $NH_4OH$) of about 20-60 g/l, usually about 0.75 M. That is, the amount of $NH_4OH$ should be sufficient to achieve such a solution concentration of formate salt when formic acid is employed as the acid. Equivalent amounts can be employed when $H_2SO_4$ is the acid. This is a preferred embodiment since the ammonium hydroxide is often used up initially at such a fast rate that the pH of the solution drops to such a low value that the reaction proceeds undesirably slowly. The extra addition of ammonium hydroxide, thus, simply speeds up the reaction. Similarly, ammonium hydroxide can be added after the urea addition for the same purposes and in generally the same concentrations.

The pH of the aqueous solution at the start of the precipitation, i.e., after the urea addition is, operably, as low as about 1.0 and preferably 1.4-2.0.

At the end of the precipitation of the dense iron precipitate, the pH is usually 2.7-3.6. Higher pH's can be obtained, e.g., 3.6-4.5 or even about 5.0, but this serves no purpose since the precipitation will be complete at the lower mentioned pH values.

The iron precipitate is an iron hydroxide, e.g., generally FeOOH. If ferric sulfate is used in the aqueous solution, the salt is $Fe_3(SO_4)_2(OH)_5.2H_2O$. Because of the unavoidable sulfur content of this product, it is a less preferred dense precipitate for preparation of iron powder by reduction; however, the resultant iron powder is suitable for the purposes required by this invention.

The FeOOH dense precipitate can be in the alpha or beta configuration. Upon reduction, either form will produce an iron powder of the requisite properties. Thus, which configuration is obtained is not critical, the determining factor being the nature of the post-treatment, if any, to which the precipitate is subjected, including standing time, temperature exposure, etc. Usually, the beta-configuration is obtained.

The dense iron precipitate is separated from the mother liquor by any suitable fully conventional technique, usually by simple filtration and washing e.g., with water several times in order to ensure that all of the precipitate is obtained. The filtrate and washing liquids can be reheated to boiling to precipitate additional FeOOH which is then separated as described above.

The total precipitate is subsequently conventionally dried, e.g., at 100°-110° C. for 1-3 hours. Yields of FeOOH of greater than 96% are produced by this method.

The resultant powdered precipitate is subjected to the hydrogen reduction treatment. Prior to this step, it can be ground to a size smaller than −20 mesh, preferably about 20 mesh. The reduction treatment can be effected in a hydrogen furnace, wherein hydrogen pressure and flow rate are non-critical. Treatment temperatures are usually 650°-900° C., preferably 825° to 875° C. most preferably about 850° C. and treatment times are ½-2 hours, most preferably about ½ hour. Temperature and time of treatment are important. Prior to exposure to the atmosphere, the iron powder is cooled to about room temperature under hydrogen. Details of the hydrogen reduction are otherwise fully conventional.

The following equations describe the overall reactions involved in two of the embodiments of this invention:

1. (a) $3Fe(SO_4)_3 + 5CO(NH_2)_2 + 19H_2O \rightarrow 2Fe_3(SO_4)_2(OH)_5.2H_2O + 5(NH_4)_2SO_4 + 5CO_2$
   (b) $2Fe_3(SO_4)_2(OH)_5.2H_2O + 9H_2 \rightarrow 6Fe + 14H_2O + 4H_2SO_4$
2. (a) $2FeCl_3.6H_2O + 3CO(NH_2)_2 + H_2O \rightarrow 2FeO(OH) + 6NH_4Cl + 3CO_2 + 6H_2O$
   (b) $2FeO(OH) + 3H_2 \rightarrow 2Fe + 4H_2O$ Among the important features of this invention is the fact that high purity, high grade iron powder is produced and, yet, only inexpensive, technical grade reagents need be used in the process.

The iron powder produced by this method has been subjected to extensive diagnostic measurement. It has been clearly shown to be at least equivalently useful as NX-1000 for the iron component in the iron-potassium perchlorate heat-powder fuel mixture used in thermal batteries by testing in accordance with Sandia Specification Nos. SS 265866-003 and SS 344796-200 Issue B.

Figure 2:
FIG. 2 depicts a scanning electron micrograph of iron powder prepared by the process of this invention; 1000×.

Among the more notable properties of the acicular iron powder particles of this invention are their spongelike appearance which is similar to that of NX-1000. Herein, "spongelike structure" refers to the particle shape and surface type as it appears in a scanning electron micrograph such as those of FIGS. 1 and 2. This description is conventional in this field and is conventionally used to describe the particle shape of NX-1000. The iron particles of this invention are also millable to any desired grain size. Most importantly, the process of this invention provides this iron powder in a very high purity exceeding 99%.

In addition to the mentioned use in the fuel for thermal batteries, the iron powder of this invention is also suitable for use in accordance with fully conventional procedures in recording tapes and catalysts.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Technical grade ferric chloride hexahydrate (205 g) was added to 500 ml of water. To this solution, 10 ml of nitric acid was added and the mixture was heated to ensure solution. The solution was cooled and 300 ml of formic acid/water 8 N (1-2) was added. Then 300 ml of an ammonium hydroxide/water mixture 5 N (1-2) was added. To this solution was added 160 g of urea and 300 ml of water. The resulting solution had a pH of 3.8. The solution was heated to boiling for 1 hour. Upon heating, the precipitate formed. This consisted of dense iron oxide hydroxide containing approximately 1% of chloride. The solution was vacuum filtered using Whatman Number 541 filter paper in a Buchner funnel. The filtrate was reheated to boiling to precipitate more FeOOH. The precipitate was then dried at 100°-110° C. Yields of FeOOH of greater than 96% were produced. The resulting powder was ground to pass through a 20 mesh screen and was placed in a hydrogen furnace at 700° C. for ½ hour. The resulting iron powder was cooled in hydrogen before being exposed to the atmosphere.

The powder produced in this example was characterized by measurement of various physical properties. These are reported in Example 4 below as Sample No. 1776 thereof.

In addition, by repeated performance of essentially the same steps recited in this example, about 5 lbs. of the resultant iron powder was accumulated. This powder was subjected to extensive testing to determine its suitability for use in the fuel mixture for thermal batteries as described above. It was found to be very satisfactory for such use and, in essence, equivalent to the commercially available NX-1000 product.

The tested material was subjected to a ball mill grinding operation prior to testing due to the limited amount of material available. With larger amounts of material available, e.g., in accordance with scaled up procedures such as those exemplified below, improved grinding techniques such as shear type grinders or micropulverizers, even improved performances of the iron powder have been obtained.

Among the measured properties were a calorific output of 221.0 cal/g; a gas evaluation of 0.413 ml/g; an ignition sensitivity for the 50% fire level of 0.895 joules and for the 90% fire level, of 1.057 joules; a pellet breaking strength of 1.08 pounds; and a burn rate of 2.01 in/sec.

EXAMPLE 2

Ferrous sulfate ($FeSO_4.7H_2O$)(502 g) was added to 1500 ml of water; to this solution, 15 ml of concentrated sulfuric acid was added. Ammonium persulfate (205 g) was added and the mixture was heated at 100° C. for 30 minutes to ensure complete oxidation of the ferrous ions to ferric ions. Ammonium hydroxide was added to react with the sulfuric acid; then an additional 1500 ml of water and 105 g of urea were added. The solution was heated for two or three hours at 95° to 100° C. The precipitate formed was filtered out and dried at 110° C. The precipitate was $Fe_3(SO_4)_2(HO)_5.2H_2O$. The resulting powder was placed in a hydrogen furnace at 700° C. for one-half four. The resulting iron powder was cooled in hydrogen before being exposed to the atmosphere.

The iron powder had the appearance of NX-1000 but contained excessive amounts of sulfur. Iron power produced this way may also be of use in the new LiSi/iron disulfide batteries.

EXAMPLE 3

The purpose of this example was to indicate that the process of this invention can be scaled up to produce iron powder in large quantities. In this particular example, 1,000 gram quantities were sought.

In order to scale up the method from 100 gram quantities of 1000 gram lots of iron powder, larger batch sizes were made using different concentrations of iron chloride in solution. The amount of iron in solution was varied from 0.4 to 2.0 M. The starting pH ranged from 1.4 to 1.9 and precipitation was completed at a pH from 2.7 to 3.6. The average solution final pH was 3.2 as compared to 4.5 for carrying out of the process on the smaller scale. Urea at a concentration of 1.5 molar was used to supply ammonium hydroxide slowly to the foregoing solution, and formic acid was added to form an easily filtered dense precipitate. Nitric acid was added to prevent the initial hydrolysis of the $FeCl_3$ solution and to help prevent the reduction of ferric to ferrous ions during the reaction. The initial precipitate contained from 3.3-7.1% of chlorine and was believed to be the compound $(FeOOH)_{8.6}$ $(FeOCl)_{1.47}$ $(FeO CHO_2).6H_2O$ as reported by Goode et al (Anal. Chem. 37, 123 (1965)).

Precipitates were analyzed by x-ray diffraction and showed the patterns of beta FeOOH. The results of the experiments are summarized in Table I. The percent recovery reported there is a minimum value since some iron was lost in testing samples of the reaction solution for composition analysis. As can be seen from Table I, in this particular set of runs, the optimum iron concentration was about 0.6 M.

The iron powder was also analyzed via a scanning electron microscope and showed a sponge-like appearance equivalent to that known for NX-1000 (Pfizer) iron powder.

The four iron powders tested were identified by the following numbers; 1776, 1976, 282, and 983.

The results of the chemical characterization of the iron powders are presented in Table II below.

Wet chemical methods were used to determine the percent of metallic iron and percent of total iron. Hy-

TABLE I
MATERIALS AND CONDITIONS USED FOR PREPARATION OF IRON (III) OXIDE HYDROXIDE

| | WT. of STARTING MATERIAL FeCl$_3$.6H$_2$O (grams) | WT. of IRON (grams) | VOLUME OF SOLUTION (Liters) | CONCENTRATION OF IRON IN SOLUTION g/l | CONCENTRATION OF IRON IN SOLUTION Moles | pH START/END | % RECOVERY FeOOH |
|---|---|---|---|---|---|---|---|
| #32 | 203 | 41.9 | 0.932 | 44.9 | 0.805 | 3.8/4.5 | 92 |
| #69 | 833 | 172 | 7.47 | 23.0 | 0.41 | 1.8/3.6 | 81.5 |
| #70 | 1601 | 331 | 8.97 | 36.9 | 0.66 | 1.4/2.7 | 95.9 |
| #71 | 2000 | 413 | 7.95 | 52.0 | 0.93 | 1.5/3.4 | 88.8 |
| #72 | 3893 286 (Fe$_2$O$_3$) | 1004 | 8.71 | 115.3 | 2.07 | 1.9/3.0 | 91.7 |

An illustrative example of the precise procedure used in this example follows: Iron III chloride hexahydrate (1600 g) was added to 5000 ml of water. To this solution, 40 ml of nitric acid was added and the mixture was heated to ensure solution. The mixture was cooled and 912 ml of formic acid/water 8 N (1–2) was added. Then, 912 ml of an ammonium hydroxide/water mixture 5 N (1–2) was added. To this was added 675 grams of urea and water. The resulting solution had a pH of 1.4. The solution was heated to 104° C. for two hours. Ammonium hydroxide 0.5 N was added slowly during the heating at the rate of 900 ml per hour. The precipitate formed was filtered and dried at 105° C. The precipitate was reduced in dry hydrogen at 850° C. for thirty minutes.

The results of this example clearly demonstrated that the process is readily scalable to produce 1000 gram quantities. Even larger quantities can be easily produced.

EXAMPLE 4

Four iron powders produced by the process of this invention were characterized by ten chemical and physical tests. In general, the samples showed a metallic iron purity ranging from 96.7 percent to 99.1 percent. The total iron purity for all samples was greater than 99 percent. The major impurities found were oxygen, magnesium, calcium and silicon. Specific surface areas varied from 0.21 m$^2$/g to 0.82 m$^2$/g. Particle size distribution analyses showed average particles ranging from 25 to 44 μm. Scanning electron micrographs showed all samples having similar dendritic particle shapes with large agglomerates showing "popcorn" or spongy appearance.

drogen, nitrogen, and oxygen were determined by inert gas fusion methods using LECO instrumentation. Aluminum was determined by optical emission spectrography. Conventional methodology was used in all cases.

All samples showed a metallic iron purity of greater than 96% and a total iron purity of greater than 99%. The major impurity found was oxygen, which ranged from 0.25 to 0.41 percent. The total mass balance for all samples ranged from 100.2 to 100.6 percent.

Semiquantitative mass spectrographic analyses were made on the four iron powders and the trace impurities found are listed in Table III. The percents of total impurities were included in the total mass balance data in Table II. Manganese, calcium (except for sample 1976) and silicon were the major impurities. The total impurities found in all samples ranged from 0.21 percent to 0.47 percent.

The physical properties of the four iron powders are presented in Table IV. Surface area measurements were made using a Monosorb Surface Area Analyzer which operates using the low-temperature gas adsorption (BET) technique. The results show specific surface areas varying from 0.21 to 0.82 m$^2$/g.

TABLE II
CHEMICAL CHARACTERIZATION OF IRON POWDER

| CONSTITUENT % | SAMPLE No. 282 | 983 | 1776 | 1976 |
|---|---|---|---|---|
| Metallic Iron | 98.5 | 99.1 | 98.7 | 96.7 |
| Total Iron | 99.7 | 100.0 | 99.7 | 99.6 |
| Hydrogen | 0.0038 | 0.0048 | 0.0049 | 0.0048 |
| Nitrogen | 0.0017 | 0.0029 | 0.0072 | 0.0063 |
| Oxygen | 0.34 | 0.25 | 0.38 | 0.41 |
| Aluminum | 0.01 | 0.02 | 0.02 | 0.01 |
| Metallic Impurities* | 0.47 | 0.38 | 0.33 | 0.21 |
| Total Mass Balance | 100.6 | 100.6 | 100.4 | 100.2 |

*Semiquantitative mass spectrographic analysis in Table II.

TABLE III
SEMI-QUANTITATIVE MASS SPECTROGRAPHIC ANALYSIS

| ELEMENT AND MASS NUMBER MEASUREMENT | IRON POWDER SAMPLE NUMBER (Concentration (ppm by weight)) 282 | 983 | 1776 | 1976 |
|---|---|---|---|---|
| Barium | 39 | 160 | 21 | — |
| Tin | — | 20 | — | — |
| Silver | 52 | 40 | — | — |
| Molybdenum | 42 | — | 39 | 23 |
| Zirconium | — | — | 11 | 13 |
| Strontium | 5 | 10 | 33 | — |
| Bromine | 4 | 13 | — | — |

TABLE III-continued
SEMI-QUANTITATIVE MASS SPECTROGRAPHIC ANALYSIS

| ELEMENT AND MASS NUMBER MEASUREMENT | IRON POWDER SAMPLE NUMBER (Concentration (ppm by weight)) | | | |
| --- | --- | --- | --- | --- |
| | 282 | 983 | 1776 | 1976 |
| Copper | — | — | 9 | 19 |
| Nickel | 100 | <64 | 52 | 16 |
| Cobalt | 8 | 24 | 9 | 10 |
| Manganese | 1900 | 500 | 1000 | 640 |
| Chromium | 55 | 38 | 280 | 280 |
| Calcium | 880 | 1400 | 350 | 67 |
| Potassium | <64 | <120 | <61 | <71 |
| Chlorine | 40 | 130 | 37 | 43 |
| Sulfur | 110 | 180 | 80 | 63 |
| Phosphorus | 2 | 4 | 13 | 29 |
| Silicon | 210 | 430 | 340 | 200 |
| Aluminum | | | | |
| Magnesium | 110 | 210 | 100 | 24 |
| Sodium | <1000 | — | <770 | <530 |
| Carbon | 74 | 460 | 110 | 83 |
| Boron | 2 | 2 | 2 | <1 |
| TOTAL IMPURITIES IN % | 0.47 | 0.38 | 0.33 | 0.21 |

TABLE IV
PROPERTIES OF IRON POWDER

| PROPERTY | SAMPLE NUMBER | | | |
| --- | --- | --- | --- | --- |
| | 282 | 983 | 1776 | 1976 |
| Surface Area (m²/g) | 0.49 | 0.21 | 0.82 | 0.72 |
| PARTICLE SIZE | | | | |
| % Finer than (Microns) | | | | |
| 75% | 44 | 35 | 59 | 42 |
| 50% | 33 | 25 | 44 | 33 |
| 25% | 22 | 16.2 | 29.5 | 18.5 |
| SIEVE ANALYSIS (%) | | | | |
| − 80 Mesh | 100 | 100 | 100 | 100 |
| +Mesh | 34.5 | 43.4 | 35.6 | 45 |
| − 140 Mesh | 65.5 | 56.6 | 64.4 | 55 |

Particle size distribution analyses were performed using a Sedigraph 5000 instrument. The iron powders were sieved through a 140 mesh screen to break up large agglomerates and to screen out particles larger and 106 μm. The particle size distribution results presented in Table IV show iron powder 983 contained the smallest particles while iron powder 1776 contained the largest particles. These results, in combination with the surface area data, suggest varied differences in porosity.

The four iron powders were sieved through 80 and 140 mesh screens. All samples passed through an 80 mesh screen. Samples 282 and 1776 contained the largest percent of particles smaller than 106 μm, which passed through the 140 mesh screen.

Scanning electron micrographs were taken of the four iron powders at a 1000× magnification for comparison of particle shapes. All four iron powders showed a dendritic shape similar to the shape of NX-1000 iron powder (Pfizer). Similarly, the agglomerates all showed a "popcorn" form, i.e., spongy appearance. No distinct differences between the four iron powders were observable.

EXAMPLE 5

The purpose of this example was to investigate various iron-containing starting materials, subsequently reduced in hydrogen to determine whether they would be useful for producing heat powder mixtures usable in thermal batteries. Two classes of such starting materials were used. The first was constituted by iron sources used as starting materials in the process of this invention. The second class was constituted by iron-containing materials per se reduced in hydrogen to produce an iron powder. As can be seen below, five of the materials tested produced iron powder suitable for use in thermal batteries, i.e., powders having properties more or less equivalent to those of NX-1000 of Pfizer. The materials producing iron powders similar to NX-1000 upon reduction were the precipitates obtained in the process of this invention, various commercially available ferric citrates, red ferric oxides, yellow ferric oxides and a mixture of commercially available red ferric oxide and yellow ferric oxide.

In Sandia Laboratories Report SC-RR69-497 of November, 1969, by Bush, the following properties of NX-1000 as reported by Pfizer are listed:

| | |
| --- | --- |
| Total iron as Fe | 97% minimum |
| Metallic Fe° | 89% minimum |
| Oxygen (associated with Fe) | 2.3% maximum* |
| Green strength (ASTM B312-56T) | 3000–6000 psi |
| Fisher subsive size | 1.5–3.5 |
| −325 mesh | 70% minimum |
| +100 mesh | 1.0% maximum |

*e.g., as measured by H₂ reduction weight loss

Similar properties have been suggested for screening of iron powders for suitability for thermal battery used by others, e.g., iron assay, particle size distribution scanning electron microscope data at various magnifications, and specific surface area were suggested by Attewell, Royal Aircraft Establishment, Farnborough, Materials Department, Battery Report 254, January 1974.

Two furnaces were used for the reduction of the samples. Initially a Pereco Hydrogen furnace manufactured by Pereny Equipment Co. that could reduce up to 25 grams of iron oxide was used. The temperature of reduction was 660° C. or 700° C. in dry hydrogen. An alumina ceramic boat was used that would hold 40 cc of oxide. A larger General Electric box molybdenum hydrogen furnace was used for the latter part of this study. The General Electric furnace would reduce up to 86 grams of iron oxide. The temperature reduction was 900° C. in dry hydrogen. A Wesco ceramic boat was used that could hold 325 cc of oxide.

The materials used for this study are listed in Table V. As well, the source, starting material, and precipitated form are listed. Notes are also included on drying or ignition temperatures, impurities, etc. The results of the hydrogen reductions are listed in Table VI.

ferent from NX-1000. The relative cost of the starting materials was also determined. Typical results as of 1978 are presented in Table VII.

TABLE V

| | MATERIAL USED FOR PREPARATION OF IRON POWDER | | | |
|---|---|---|---|---|
| SAMPLE No. | SOURCE | STARTING MATERIAL | PRECIPITATED FORM | NOTES |
| 24 | GE 3/76 | $FeCl_3$ | FeOOH | |
| 25 | Fisher-Red $Fe_2O_3$ (324) | $Fe_2O_3$ | — | |
| 26 | Fisher-Red | $Fe_2O_3$ | — | |
| 27 | ROC/RIC Yellow Oxide | $\alpha$FeOOH | — | |
| 28 | GE 10/76 | $FeCl_3$ | FeOOH | 0.3% Cl |
| 29 | GE 1977 | $FeCl_3$ | FeOOH | 0.7% Cl |
| 30 | GE 2/77 | $FeCl_3$ | $\beta$FeOOH | 0.3% Cl |
| 30a | GE 2/77 | $FeCl_3$ | $\beta$FeOOH | Dried at 1 |
| 31 | GE 3/76 | $FeCl_3$ | FeOOH | |
| 32 | GE 3/77 | $FeCl_3$ | $\beta$FeOOH | |
| 32a | GE/77 | $FeCl_3$ | $\beta$FeOOH | |
| 33 | ROC/RIC-Red | $Fe_2O_3$ | — | |
| 34 | ROC/RIC-Siderite | $FeCO_3$ | — | |
| 35 | Fisher-Red $Fe_2O_3$ (324) | $Fe_2O_3$ | — | |
| 36 | Fisher-Red $Fe_2O_3$ (683) | $Fe_2O_3$ | — | |
| 36a | Fisher-Red $Fe_2O_3$ (683) | $Fe_2O_3$ | — | |
| 37 | Fisher I Ferric Nitrate | $Fe(NO_3)_3$ | Amorphous $Fe_2O_3$ | |
| 38 | Fisher I Ferric Nitrate | $Fe(NO_3)_3$ | Amorphous $Fe_2O_3$ | |
| 39 | ROC/RIC Yellow Oxide | $\alpha$FeOOH | — | |
| 40 | Ferric Citrate MCB | $Fe(C_6H_5O_7) \cdot XH_2O$ | $Fe_2O_3$ | 750° C. |
| 41 | GE | $FeCl_3$ | FeOOH | 0.38% Cl |
| 42 | Mixture of #26 + 36, 50%–50% | $FeOOH + Fe_2O_3$ | — | |
| 43 through 51 | Gum Precipitate $Fe_2O_3$ | See Table III | | |
| 52 | Ferrous Oxalate MCB | $FeC_2O_4 \cdot 2H_2O$ | $\alpha Fe_2O_3$ | 200° C. |
| 52a | Ferrous Oxalate MCB | $FeC_2O_4 \cdot 2H_2O$ | $\alpha Fe_2O_3$ | 400° C. |
| 53 | Ferrous Oxalate MCB | $FeC_2O_4 \cdot 2H_2O$ | $\alpha Fe_2O_3$ | 225° C. |
| 53A | Ferrous Oxalate MCB | $FeC_2O_4 \cdot 2H_2O$ | $\alpha Fe_2O_3$ | 225° C. |
| 54 | #27 Dried at 100° C. for 24 hours | FeOOH | | |
| 55 | Fisher I-86 Ferric Chloride Technical | $FeCl_3 \cdot 6H_2O$ | $\alpha Fe_2O_3$ | $NH_4OH$ PPT. |
| 56 | Fisher I-86 Ferric Chloride Technical | $FeCl_3 \cdot 6H_2O$ | $\beta$FeOOH + $\alpha$FeOOH | Homo. PPT. |

The chemical furnace was used in samples 26-53A. The large General Electric molybdenum hydrogen furance was used in samples 25, 26, and 54–56. In addition repeat samples of 25, 27, 35, 36, 39, and 42, in all 15 additional examples, were reduced.

As mentioned above, of all the materials listed in Table V, five were found to produce iron powders similar to NX-1000. The results reported in Table I represent fifty different reduction runs. The total number of different compounds or starting materials was twelve. Two of the materials, a ferric nitrate and a ferrous oxylate produced inconsistent results. Five of the compounds produced an iron powder that was different from NX-1000. The relative cost of the starting materials was also determined. Typical results as of 1978 are presented in Table VII.

One of the key criteria for determining whether an iron powder will be suitable for use in thermal batteries is the sponge-like appearance. In addition to this particle shape, particle size is another controlling factor. As a result of the data reported above, the following is one possible specification for suitability of an iron powder for use in the fuel mixture of thermal batteries:

| 97% | Fe | Minimum |
|---|---|---|
| 3% | $O_2$ | Maximum |
| −80 mesh | 100% | |

TABLE VI

RESULTS ON IRON POWDER SYNTHESIS

| SAMPLE No. | SOURCE | CRYSTAL STRUCTURE | REDUCED FORM | TIME & TEMP. OF REDUCTION | NOTES |
|---|---|---|---|---|---|
| 24 | GE 3/76 | FeOOH | Sponge | ~30 min. ~900° C. | |
| 25 | Fisher-Red 3/76 | $\alpha Fe_2O_3$* | Sponge | ~30 min. ~900° C. | |
| 26 | Fisher-Red | $\alpha Fe_2O_3$ | Sponge | 60 min. 660° C. | |
| 27 | ROC/RIC Yellow Oxide | $\alpha FeOOH$* | Sponge | 60 min. 660° C. | |
| 28 | GE 10/1976 | $\alpha FeOOH$* | Sponge | 60 min. 660° C. | |
| 29 | GE 1977 | FeOOH | Sponge | 60 min. 660° C. | |
| 30 | GE 2/1/77 | $\beta FeOOH$* Air Dried | Sponge | ~45 min. 660° C. | |
| 30a | GE 2/1/77 | $\beta FeOOH$ Dry 110° C. | | ~45 min. 660° C. | |
| 31 | GE 3/76 | FeOOH | Sponge | 50 min. 660° C. | |
| 32 | GE 3/77 | $\beta FeOOH$* Air Dried | Sponge | 50 min. 660° C. | |
| 32a | GE 3/77 | | | 50 min. 660° C. | |
| 33 | ROC/RIC Red $Fe_2O_3$ | $Fe_2O_3$ | Plates | 45 min. 660° C. | Pyrophoric |
| 34 | ROC/RIC $FeCO_3$ | Siderite* | Plates | 45 min. 660° C. | Pyrophoric |
| 35 | Fisher-Red Lot 761324 | $\alpha Fe_2O_3$ | Sponge | 45 min. 660° C. | Pyrophoric |
| 36 | Fisher-Red Lot 743683 | $Fe_2O_3$ | $\alpha Fe$* Sponge | 40 min. 660° C. | Gray |
| 36a | Fisher-Red Lot 743683 | $Fe_2O_3$ | $\alpha Fe$* + FeO | 40 min. 660° C. | Black |
| 37 | $Fe(NO_3)_3$ | Amorphous* | Plates & Sponge | 15 min. 660° C. | Small sample ~ 10 mg. |
| 38 | $Fe(NO_3)_3$ | Amorphous* | Sponge | 40 min. 660° C. | |
| 39 | ROC/RIC Yellow Oxide | $\alpha FeOOH$ | Sponge | 40 min. 660° C. | |
| 40 | $Fe(C_6H_5O_7)$ 750° C. | $Fe_2O_3$* ASTM 24-72 | Sponge | 45 min. 660° C. | |
| 41 | J.C. FeOOH | | Plates | 40 min. 660° C. | |
| 42 | FeOOH + $Fe_2O_3$ #27 + #36 50%-50% | | Sintered Sponge | 40 min. 700° C. | |
| 43 | G-4 | Amorphous | Plates | 50 min. 660° C. | Small sample |
| 44 | G-105A$_2$ | Amorphous | Plates & Sponge | 60 min. 700° C. | |
| 45 | G104A | | Plates & Acicular | 40 min. 700° C. | Fe;C 7.8% $O_2$ 1.0% $N_2$ 0.23% |
| 46 | G-201A | | Plates & Acicular | 40 min. 700° C. | Fe, 0.08% C |
| 47 | G-105A$_1$ | | Plates & Acicular | 40 min. 700° C. | Fe, 10.5% C |
| 48 | G-205A | | Plates & Fused Sponge | 40 min. 700° C. | Fe, 0.084% C |
| 49 | 303A | | Fused Sponge & Cubes | 50 min. 700° C. | Fe, 0.03% C |
| 50 | 301A | | Sponge | 45 min. 700° C. | Fe, 0013% C |
| 51 | 306A | | Sponge Partly Fused | 45 min. 700° C. | Fe, 0.28% C |
| 52 | $Fe C_2O_4$ | $\alpha Fe_2O_3$ | Sponge Partly Fused | 35 min. 700° C. | Small sample |
| 52a | $Fe C_2O_4$ | $\alpha Fe_2O_3$ | Sponge Partly Fused | 35 min. 700° C. | |
| 53 | $Fe C_2O_4$ 225° C. | | Sponge | 35 min. 700° C. | |
| 53a | $Fe C_2O_4$ 225° C. | | Sponge | 45 min. 700° C. | |
| 54 | FeOOH #27 | | Sponge | 30 min. ~900° C. | |
| 55 | G-501 | $\alpha Fe_2O_3$* | Fused Sponge | 10 min. ~900° C. | Small sample |
| 56 | GE 1/11/78 | $\alpha FeOOH$* + $\beta FeOOH$* | Sponge | 30 min. 900° C. | |

*Determined by X-ray Diffraction

TABLE VII

COST OF STARTING MATERIALS

| MATERIAL | COST PER # MATERIAL | COST PER # OF IRON PRODUCED | COST PER KILOGRAM OF IRON PRODUCED |
|---|---|---|---|
| Fisher I-86 Ferric Chloride $FeCl_3.6H_2O$ Tech. | $1.60 | $7.74 | $17.06 |
| ROC/RIC Fe-52 | $4.75 | $7.56 | $16.66 |

TABLE VII-continued

| | COST OF STARTING MATERIALS | | |
|---|---|---|---|
| MATERIAL | COST PER # MATERIAL | COST PER # OF IRON PRODUCED | COST PER KILOGRAM OF IRON PRODUCED |
| Ferric oxide-yellow FeOOH Fisher I-116 | $8.20 | $11.72 | $25.84 |
| Ferric oxide-red $Fe_2O_3$ Hemetite | $1.27 | $1.82 | $4.01 |
| $Fe_2O_3$ Limonite FeOOH | $1.27 | $2.02 | $4.45 |

| | |
|---|---|
| −100 mesh | 75% |
| −325 mesh | 50% |
| Particle shape | sponge appearance |
| Apparent density | less than 1.0 g/cm$^3$ |

A Green strength (ASTM B312-56T) of 4000–6000, preferably about 4500 psi

EXAMPLE 6

Data similar to that gathered in Example 5 were gathered with respect to various iron powders produced from various starting materials used in the process of this invention. These data are reported in Table VIII below.

Sample numbers 69–72 are iron powder sample produced from larger batch sizes as reported in Example 3 above. Sample numbers 57–59 and 64–68 are repeat samples. Sample number 60 is for direct reduction of yellow ferric oxide and sample numbers 61–63 are natural mineral samples which subsequently were reduced.

EXAMPLE 7

As with NX-1000, the iron powder produced by this invention is preferably ground prior to its use to prepare the iron-potassium perchlorate heat-powder mixture used as a fuel in thermal batteries. Various methods of grinding have been tested to determine their effects on particle size and shape. In this example, a Ball mill, a Fitz mill, a Mikropulverizer, and a Straub mill were used.

TABLE VIII

| | RESULTS ON IRON POWDER SYNTHESIS | | | | |
|---|---|---|---|---|---|
| SAMPLE No.[1] | SOURCE | CRYSTAL STRUCTURE | REDUCED FORM | TIME & TEMP. OF REDUCTION | NOTES |
| 57 [2] | Fisher-Red Lot 761324 | $\alpha Fe_2O_3$ | Sponge | 900° C. 30 min. | 0.937 A.D. |
| 58 [2] | ROC/RIC Yellow Oxide | FeOOH | Sponge | 900° C. 30 min. | 0.573 A.D. |
| 59 | Fisher Red Lot 774354 | $\alpha Fe_2O_3$ | Fused Sponge | 900° C. 30 min. | 1.26 A.D. |
| 60 | ROC/RIC Yellow Oxide 10# New Lot | $\alpha FeOOH$ | Sponge | 900° C. 30 min. | 0.787 A.D. 7/18/78 |
| 61 | Goethite | $\alpha FeO(OH)$* | Fused Plate & Sponge | 800° C. 35 min. | — |
| 62 | Hematite Oolitic | $Fe_2O_3$* | Feathered Plates | 800° C. 35 min. | — |
| 63 | Limonite | $\alpha FeOOH$* | Feathered Plates | 800° C. 35 min. | — |
| 64 | FeOOH + $Fe_2O_3$ (354) | | Sponge Partly Fused | 800° C. 30 Min. | — |
| 65 | ROC/RIC Yellow Oxide 10# New Lot | FeOOH | Sponge Partly Fused | 800° C. 35 min. | |
| 66 | Fisher Red Lot 774354 | $\alpha Fe_2O_3$ | Sponge Partly Fused | 800° C. 35 min. | |
| 67 | Fisher Red 761324 | $\alpha Fe_2O_3$ | Sponge | 800° C. 35 min. | |
| 68 | ROC/RIC Yellow Oxide 10# New Lot | FeOOH | Sponge | 810° C. 30 min. | Oxide dried 110° C. - 5 h |
| 69 | GE 12/13/78 | $\beta FeOOH$* | Sponge | 800° C. 30 min. | |
| 70 | GE 1/9/79 | $\beta FeOOH$* | Sponge | 810° C. 30 min. | 0.24 A.D. |
| 71 | GE 1/19/79 | $\beta FeOOH$* | Sponge | 800° C. 30 min. | 0.43 A.D. |
| 72 | GE 4/2/79 | $\beta FeOOH$* | Sponge | 850° C. 30 min. | 0.55 A.D. |

[1] CHM 78-094[7]
[2] CHM 78-138[8]
*Determined by X-ray Diffraction

The Fitz mill sample showed minimal apparent damage to the iron powder particles. The Straub mill sample showed some shear marks on the iron powder particles. The Ball mill and Mikropulverizer samples showed a compacted appearance of the spongelike iron powder particles. Surface areas varied from 0.23 to 0.84 M²/g. Apparent powder density varied from 0.667 to 2.23 g/cm³. The Mikropulverized sample produced a particle size distribution that was like that of Pfizer's NX-1000.

The Ball mill grinds with an impact and abrasion action. The Fitz mill grinds with a shearing and impact action. The Mikropulverizer grinds with an impact and crushing action. The Straub mill grinds with a crushing and abrasion action.

The results of the grinding studies are presented in Table IX.

As with the NX-1000 iron powder, these results demonstrate that it is preferred that the iron powder obtained in accordance with this invention be ground using a Mikropulverizer prior to its use as a fuel component for thermal batteries.

TABLE IX

| RESULTS OF GRINDING IRON POWDER | | | | | | |
|---|---|---|---|---|---|---|
| SAMPLE No. | 1 | 2 | 3 | 4 | E2 | 26 |
|  | STRAUB MILLED | FITZ MILLED | MIKRO-PULVERIZED | MIKRO-PULVERIZED | BALL MILLED |  |
| SAMPLE SOURCE | GE 39 | GE 35,36,39 | GE 36 | GE 42C | GE 1776 | Pfizer NX1000 |
| PERCENT RECOVERED | 98.8 | 98.1 | 93.6 | — | 99+ | — |
| % −140 MESH | 17.0 | 61.3 | 58.1 | 83.3 | 48 | 87.6 |
| % −80 MESH | 11.9 | 17.0 | 14.3 | 11.3 | 26.6 | 8.9 |
| % +80 MESH | 59.9 | 14.1 | 9.2 | 4.8 | 25.4 | 3.5 |
| % +20 MESH | 10.0 | 0.13 | 12.0 | .7 | — | — |
| SIZE OF PARTICLES |  |  |  |  |  |  |
| FINER THAN 75% | 37 | 43.5 | 36 | 28.5 | 59 | 27 |
| (VALUES IN 50% | 27 | 33 | 25 | 20.0 | 44 | 20 |
| MICRONS) 25% | 17.5 | 21 | 14.5 | 10.0 | 29.5 | 12.5 |
| SURFACE AREA M²/g | 0.54 | 1.2 | 0.23 | 0.84 | 0.82 | 0.76 |
| APPARENT POWDER DENSITY BEFORE MILLING g/cm³ | 0.65 | 0.78 | 1.18 | 0.716 | — | — |
| AFTER MILLING g/cm³ | 0.667 | 1.39 | 2.23 | 1.57 | 1.45 | 0.812 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing metallic iron powder having a spongelike structure, a total iron content of 97% minimum, a metallic iron (Fe°) content of 89% minimum, an oxygen content of 2.3% maximum, a Green strength of 4000-6000 psi, and a Fischer subsive size of 1.5-3.5, with a minimum of 70% of a size of −325 mesh and a maximum of 1.0% of a size of +100 mesh. comprising,
heating to boiling for 1-3 hours, an aqueous solution comprising 0.4-2 M of a solubilized ferric salt, 10-40 g/l of formic acid or sulfuric acid and 60-120 g/l of urea, thereby obtaining a precipitate,
separating the precipitate,
drying it, and
reducing the dried precipitate by treating it with hydrogen gas at 650°-900° C. for ½-2 hours,
thereby producing iron (Fe°) powder having a total iron content of 97% minimum, a metallic iron (Fe°) content of 89% minimum, an oxygen content of 2.3% maximum, a Green strength of 4000-6000 psi, and a Fisher subsive size of 1.5-3.5, with a minimum of 70% of a size of −325 mesh and a maximum of 1.0% of a size of +100 mesh.

2. A process of claim 1 wherein the aqueous solution further comprises an amount of added NH₄OH sufficient to effect a concentration of ammonium formate of 20-60 g/l when formic acid is present in the aqueous solution.

3. A process of claim 1, wherein the ferric salt is ferric chloride or ferric sulfate.

4. A process of claim 1 wherein the ferric salt is ferric chloride.

5. A process of claim 1 or 4 wherein the acid is formic acid.

6. A process of claim 4 wherein the aqueous solution is prepared by first adding to water sufficient ferric chloride to prepare a ferric chloride solution of a concentration of about 255 g/l when fully dissolved,
adding HNO₃ thereto to a concentration of about 10 g/l and heating to solubilize all of the ferric chloride,
cooling the resultant solution to about room temperature, and
adding formic acid and then urea thereto.

7. A process of claim 3 or 6 wherein the drying step is effected at 100°-110° C.

* * * * *